United States Patent [19]

Heinle et al.

[11] Patent Number: 5,086,830
[45] Date of Patent: Feb. 11, 1992

[54] AIR-CONDITIONING SYSTEM FOR MOTOR VEHICLES

[75] Inventors: Dieter Heinle, Plüderhausen; Wolfgang Volz, Magstadt, both of Fed. Rep. of Germany

[73] Assignee: Mercedes-Benz AG, Fed. Rep. of Germany

[21] Appl. No.: 575,665

[22] Filed: Aug. 31, 1990

[30] Foreign Application Priority Data

Aug. 31, 1989 [DE] Fed. Rep. of Germany ....... 3928944

[51] Int. Cl.$^5$ .......................... B60H 1/00; B60H 1/32
[52] U.S. Cl. ........................................ 165/16; 165/22; 165/42; 165/43; 236/49.3; 236/13; 454/160; 454/161; 454/145
[58] Field of Search ................ 165/42, 43, 16, 22, 165/12; 98/2.01, 2.11; 236/49.3, 13

[56] References Cited

U.S. PATENT DOCUMENTS

| | | | |
|---|---|---|---|
| 4,697,734 | 10/1987 | Ueda | 165/16 |
| 4,759,269 | 7/1988 | Brown et al. | 165/42 |
| 4,762,169 | 8/1988 | Andersen et al. | 165/43 |
| 4,829,884 | 5/1989 | Kagohata | 165/16 |
| 4,858,676 | 8/1989 | Boltik et al. | 165/16 |
| 4,919,195 | 4/1990 | Tanino | 165/43 |

OTHER PUBLICATIONS

ATZ-Automobiltechnische Zeitschrift, NR 9/1987, pp. 505–508.
Mehr Klimakomfort im Personenwagen-Wolfgang Frank und Hans-Dieter Oess (no date).

Primary Examiner—John Ford
Attorney, Agent, or Firm—Evenson, Wands, Edwards, Lenahan & McKeown

[57] ABSTRACT

An air-conditioning system for motor vehicles having an evaporator and a heat exchanger arranged successively in the air flow. A separate air duct having an air outlet opening for the central jet, is connected on the one hand via a cold-air opening to an air-chamber upstream of the heat exchanger and, on the other hand, via a hot-air opening to an air chamber downstream of the heat exchanger. The cross-section of the bypass openings can be controlled by bypass flaps which are coupled with actuators. A control unit with stored characteristics is provided which indicate the correlation between the air quantity and air temperature of the air issuing at the central jet and the position of the bypass flaps. The control unit applies actuation values to the actuators, which actuation values effect a setting of the bypass flaps redetermined by characteristics for a preselected air quantity and air temperature.

2 Claims, 1 Drawing Sheet

AIR-CONDITIONING SYSTEM FOR MOTOR VEHICLES

BACKGROUND AND SUMMARY OF INVENTION

The present invention relates to an air-conditioning system for vehicles, in particular passenger cars.

In a known air-conditioning system of this type (W. Frank and H.-D. Oeβ "Mehr Klimakomfort im Personenwagen" [More Climatic Comfort in the Passenger Car], special publication from ATZ, Automobiltechnische Zeitschrift [Automotive Journal] No. 9/1987, p. 4, FIG. 2), temperature-controlled air is fed to the central plane of the passenger compartment by a central jet arranged in the dashboard in a so-called reheat operation. In a reheat operation, the air taken in is first cooled by the evaporator and thus dehumidified and then heated to the desired temperature in the heat exchanger. The air quantity fed to the passenger compartment is controlled by a shut-off flap at the air outlet opening for the central jet, which shut-off flap throttles the air flow to a greater or lesser extent, dependent on its position. In the operation mode "maximum cooling", cold air is additionally drawn off via the cold-air flap, also called the draw-off flap, from the space downstream of the evaporator or upstream of the heat exchanger, and fed to the passenger compartment via the air duct. In contrast, in heating operation, the air outlet is shut off via the central jet since the air—by virtue of the concept—is either too cold (less than approx. 5° C.) or very hot (more than 40° C.).

In a further air-conditioned system know from the same literature reference (p. 5, illustration 5), the hot-air flap has been omitted and the cold-air flap has the function of an air-mixing flap, by means of which cold air is mixed in with the hot air flowing into the air duct from the hot-air opening in order to achieve the desired air temperature. By a shut-off valve at the air outlet opening for the central jet, the desired air quantity is, in turn, set infinitely variably by lesser or greater throttling. In this air-conditioning system, various pressure conditions can arise in the air-conditioning box due to the throttling of the mixed air at the air outlet opening of the central jet, thereby leading to reverse flows; that is, cold air in the direction downstream of the heat exchanger, with the result that then undesirably cold air also issues from the air outlet openings located downstream of the heat exchanger for defroster, lateral and foot-room jets. This can only be avoided by additional return flaps at the cold-air and hot-air openings.

The object of the present invention is to provide an improved air-conditioning system in which temperature control and metering of the air issuing from the central jet is possible with relatively small construction expenditure.

This object is achieved in the air-conditioning system according to the invention, by a departure from the principle generally used in air-conditioning systems of temperature control by mixed-air flaps and quantity regulation by a shut-off flap. Instead, each bypass opening (hot-air and cold-air openings) is throttled individually. Since no further shut-off flap is arranged downstream of the bypass flaps for the bypass openings in the air flow direction, in all modes of operation only a single flow results in the direction of the passenger compartment. Return flaps, as in the air-conditioning system described above, therefore are unnecessary. The actuators for the bypass flaps are infinitely variable. Vacuum elements with a feedback potentiometer or electric stepping motors can be used as actuators.

A further advantage of the air-conditioning system according to the invention also lies in the reduction of noise as the bypass flaps are located relatively remotely from the central jet.

If a capability for separate setting of the air-conditioning on the driver's side of the passenger side in the passenger compartment is desired (right/left separation), separate bypass flaps for two separate central jets, that is to say a total of four bypass flaps, must be provided. In the know air-conditioning system described above, in the case of a right/left separation, a total of two mixed-air and four return flaps as well as two shut-off flaps for the quantity control would be required, which means that, in the case of the air-conditioning system according to the invention, a considerable savings of costs can be achieved with the same comfort.

Other objects, advantages and novel features of the present invention will become apparent from the following detailed description of the invention when considered in conjunction with the accompanying drawings.

DETAILED DESCRIPTION OF THE DRAWING

Figure 1:
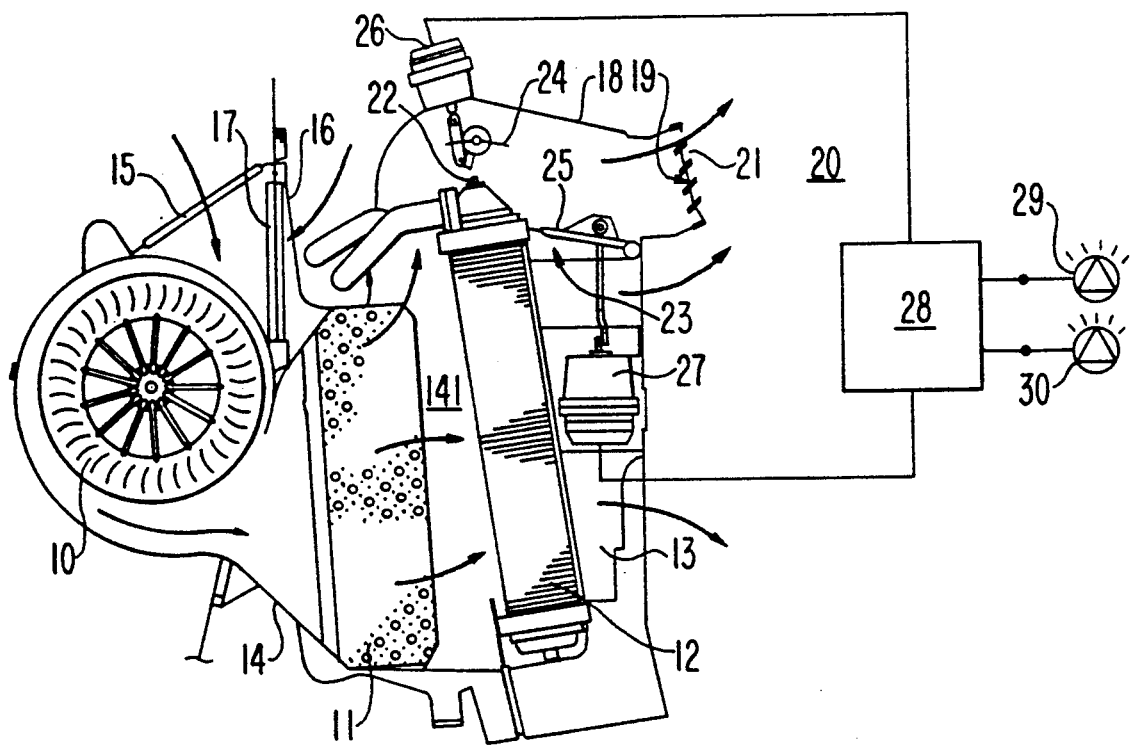
FIG. 1 shows a diagrammatic longitudinal section of an air-conditioning system for a passenger car.

The air-conditioning system illustrated diagrammatically in longitudinal section in FIG. 1 for a motor vehicle has a usually double-flow fan 10, an evaporator 11, a heat exchanger 12 and an air distributor 13. The components mentioned are arranged in a so-called air-conditioning box 14, in the specified sequence with respect to the direction of flow. The air-conditioning box 14 projects with its air distributor 13 into the passenger compartment 20 of the motor vehicle, and here has air outlet openings (not illustrated) which allow air to enter the passenger compartment 20 at various points via defroster jets, lateral jets and foot-room jets. A first intake opening 15, which is usually provided with a filter, allows the fresh air to enter the air-conditioning box 14 while so-called circulating air can be taken in from the passenger compartment 20 via a second intake opening 16. The two intake openings 15, 16 can alternately be closed or opened by an air flap 17. At the top side of the air-conditioning box 14 above the heat exchanger 12 and air distributor 13, a separate air duct 18 leads to the passenger compartment 20 and opens out there with an air outlet opening 19, on which a central jet 21 is placed which integrated in the dashboard of the passenger compartment 20. The air duct 18 is connected via a cold-air opening 22 with the chamber section 141 of the air-conditioning box 14, which is located between the evaporator 11 and the heat exchanger 12, and via hot-air opening 23 with the air distributor 13. Each of the two bypass openings 22, 23 can be closed by a bypass flap 24 or 25 which can be actuated infinitely variably by an actuator 26 or 27. The two actuators 26, 27 are connected to a control unit 28 which is connected on the input side to nominal value selectors 29, 30. The nominal value selector 29 serves for the selection of the air temperature and the nominal value selector 30 for the selection of the quantity of the air flowing into the passenger compartment 20 via the central jet 21. The nominal value selectors 29, 30 are constructed, for example, as potentiometers with an actuation range of 0–5 V, a maximum air temperature or air quantity being assigned in each case to the top limit. Stored in the control unit 28 are characteristics which indicate the correlation between the air quantity and air temperature of the air issuing at the central jet 21 and the position of the bypass flaps 24, 25. In this case, the control unit 28 operates in such a manner that it applies actuation values to the actuators 26, 27, which actuation values effect a setting of the bypass flaps 24, 25, determined by the characteristics, for the air quantity and temperature by means of the nominal value selectors 29, 30.

Figure 2:
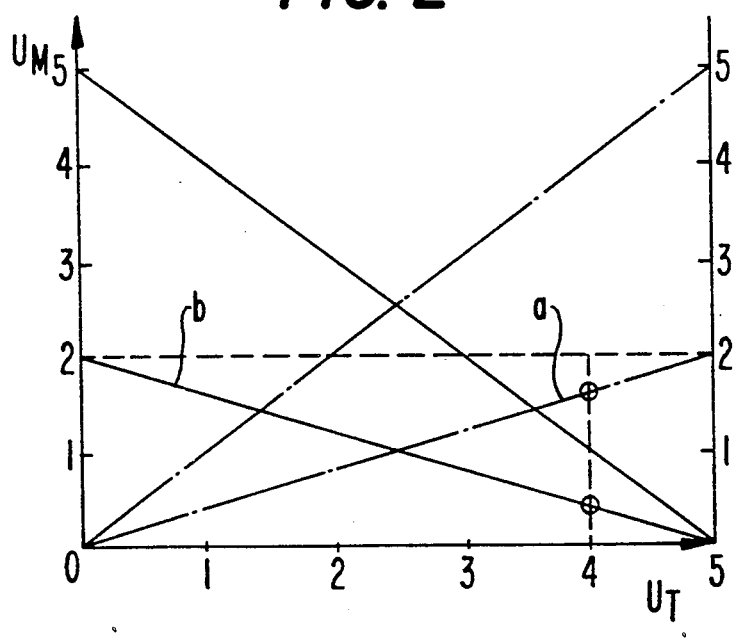
FIG. 2 shows a characteristic diagram of a control unit of the air-conditioning system in FIG. 1.

An example of the characteristics stored in the control unit 28 is illustrated in the diagram according to FIG. 2. The characteristics illustrated in dot-dashed lines for the hot-air flap 25 are given by the function $$U_M = \frac{U_M}{U_{max}} \times U_T \quad (1)$$

and the characteristic illustrated in a uninterrupted line for the cold-air flap 24 by the function $$U_K = U_M - U_W \quad (2)$$

In these equations, $U_W$ and $U_K$ are the actuation voltages from control unit 28 transmitted to the actuators 27 and 26 of hot-air flap 25 and cold-air flap 24 respectively. $U_T$ is the setting voltage within a setting range corresponding to an air temperature T selected by the nominal value selector 29. $U_M$ is the setting voltage within the same setting range corresponding to an air quantity M selected by the nominal value selector 30 and $U_{max}$ is the actuation voltage for the actuators 26, 27 to move the bypass flaps 24, 25 into the open end position in which the whole cross-section of the cold-air opening 22 and of the hot-air opening 23 is open. If, for example, the voltage of $U_m = 2$ V is predetermined by means of the nominal value selector 30, which corresponds in the case of a setting range of 5 V to a mean air quantity and a voltage $U_T = 4$ V is predetermined by means of the nominal value selector 29, which corresponds in the case of a setting range of 5 V to a top temperature, at a maximum setting voltage $U_{max} = 5$ V for complete opening of the bypass flaps 24, 25 according to equation (1) and equation (2), the characteristics of the control unit 28 identified as a and b in FIG. 2 are predetermined. With the voltage $U_T = 4$ V the control unit 28 thus supplies an actuation voltage $U_W = 1.6$ V to the actuator 27 for the hot-air flap 25 and an actuation voltage $U_K = 0.4$ V to the actuator 26 for the cold-air flap 24. The two actuation voltages are identified in FIG. 2 on the characteristics a and b by two small circles. Corresponding to the actuation values $U_W$, $U_K$, the hot-air flap 25 is opened to such an extent that slightly less than half the air passage cross-section of the hot-air opening 23 is exposed while the cold-air flap 24 very considerably throttles the cold-air opening 22. The sum of the air quantities flowing to the central jet 21 via the two bypass openings 22, 23 corresponds to the value determined by means of the nominal value selector 30. If, for example, the desire air temperature T is decreased by means of the nominal value selector 29, e.g., the voltage is set at $U_T = 2$ V, the actuation voltage $U_W$ for the actuator 27 for the hot-air flap 25 drops to 0.8 V while the actuation voltage $U_K$ for the actuator 26 of the cold-air flap 24 rises to 1.2 V. Accordingly, the hot-air opening 23 is throttled and the cold opening 22 is opened further. With an unchanged setting of the nominal value selector 30 for the desired air quantity, namely $U_M = 2$ V, the total air quantity, which is composed of the two air flows via the bypass openings 22, 23 and which flows into the passenger compartment 20 via the central jet 21, is turn unchanged.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Air conditioning system for a motor vehicle for controlling the temperature of air flowing through said air conditioner into said motor vehicle comprising:

an evaporator and a heat exchanger, arranged one downstream from the other relative to the direction of air flow;

first and second air chambers disposed upstream and downstream, respectively, from said heat exchanger relative to the direction of air flow:

an air duct having an air outlet opening for a central jet, said central jet having no air flap for controlling the flow of air therethrough, said air duct being connected via a cold air opening with said first air chamber, and connected via a hot air opening to said second air chamber, each of said hot and cold air openings having a bypass flap for regulating the flow of air therethrough, and each of said bypass flaps being coupled with an actuator for controlling the position thereof; and control means responsive to preselected air quantity and air temperature values for controlling said actuators, said control means having stored therein characteristics which indicate the correlation between quantity and temperature of said air flow and the position of said bypass flaps, and said control means having further means for causing said actuators to effect a setting of said bypass flaps which corresponds to said preselected air quantity and temperature values.

2. Air-conditioning system according to claim 1, wherein the actuators for the bypass flaps each have the same actuation voltage ranges, and wherein the characteristic for the bypass flap for said hot-air opening is given by the function $$U_W = \frac{U_M}{U_{max}} \times U_T$$

and the characteristic for the bypass flap for said cold-air opening is given by the function $$U_K = U_M - U_W$$

$U_K$ and $U_W$ being the actuation voltages for the actuators of the bypass flaps for the cold and hot air openings respectively, $U_M$ and $U_T$ being the setting voltages within a setting range corresponding to preselected air quantity and air temperature values, and $U_{max}$ being the actuation voltage for the actuators to move the bypass flaps into the fully open position, in which the whole air passage cross-section of the cold-air and the hot-air openings is exposed.

* * * * *